Nov. 9, 1926.

L. J. HOUZE, SR 1,606,297

PORTABLE HEATING APPARATUS

Filed Sept. 10, 1924     2 Sheets-Sheet 1

INVENTOR

Nov. 9, 1926.
L. J. HOUZE, SR
1,606,297
PORTABLE HEATING APPARATUS
Filed Sept. 10, 1924  2 Sheets-Sheet 2
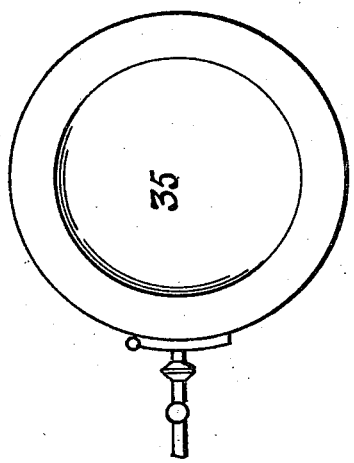
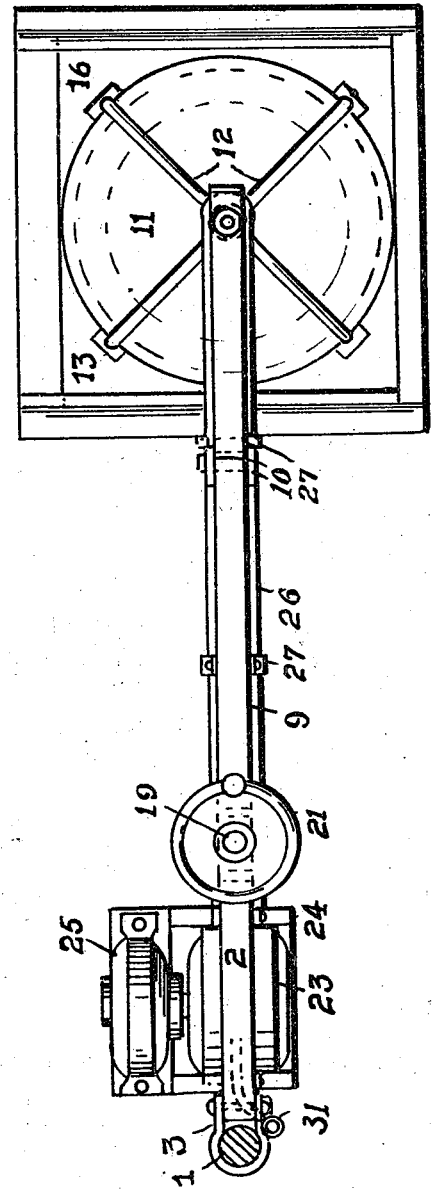
Fig. 2
INVENTOR
Leon J. Houze Sr.
By Jack Snyder
attorney Patented Nov. 9, 1926.

1,606,297

UNITED STATES PATENT OFFICE.

LEON J. HOUZE, SR., OF POINT MARION, PENNSYLVANIA, ASSIGNOR TO L. J. HOUZE CONVEX GLASS CO., OF POINT MARION, PENNSYLVANIA, A CORPORATION OF PENNSYLVANIA.

PORTABLE HEATING APPARATUS.

Application filed September 10, 1924. Serial No. 736,935.

My invention relates to a heating apparatus and while primarily intended for use in connection with the manufacture of glass it will be obvious that the device may be employed for any purposes wherein it is found to be applicable.

In the manufacture of glass products by the well known cylinder drawing process great difficulty is encountered in the production of a clear product of uniform thickness owing to the inequality of the temperature of the molten glass before drawing operation due to various causes but particularly to the cooling established to the portion of the molten glass contacting with the side of the ladle while being conveyed from the furnace to the drawing pot.

The primary object of this invention is to provide a heating apparatus, in a manner as hereinafter set forth, which will quickly reheat the molten glass after the same has been deposited in the drawing pot to establish a mass of uniform consistency and free from all bubbles and blisters; under such conditions insuring a superior drawn product, uniform throughout, and free from all defects ordinarily encountered in the manufacture of glass by the drawing process.

Further important objects of this invention are to provide a device of the type stated, which may be readily shifted to and from the heating position; which is simple in its construction and arrangement, strong, durable and efficient in its use; which includes novel means for maintaining its operating temperature; which is positive in its action, compact, adjustable and comparatively inexpensive to manufacture, install and operate.

With the foregoing and other objects in view, which will appear as the description proceeds, the invention resides in the details of construction hereinafter described and claimed, it being understood that changes in the precise embodiment of the invention herein disclosed can be made within the scope of the claims hereunto appended without departing from the spirit of the invention.

In the drawing forming a portion of this specification and wherein like numerals of reference designate corresponding parts throughout the several views:—

Figure 2 is a top plan view thereof.

Figure 1:
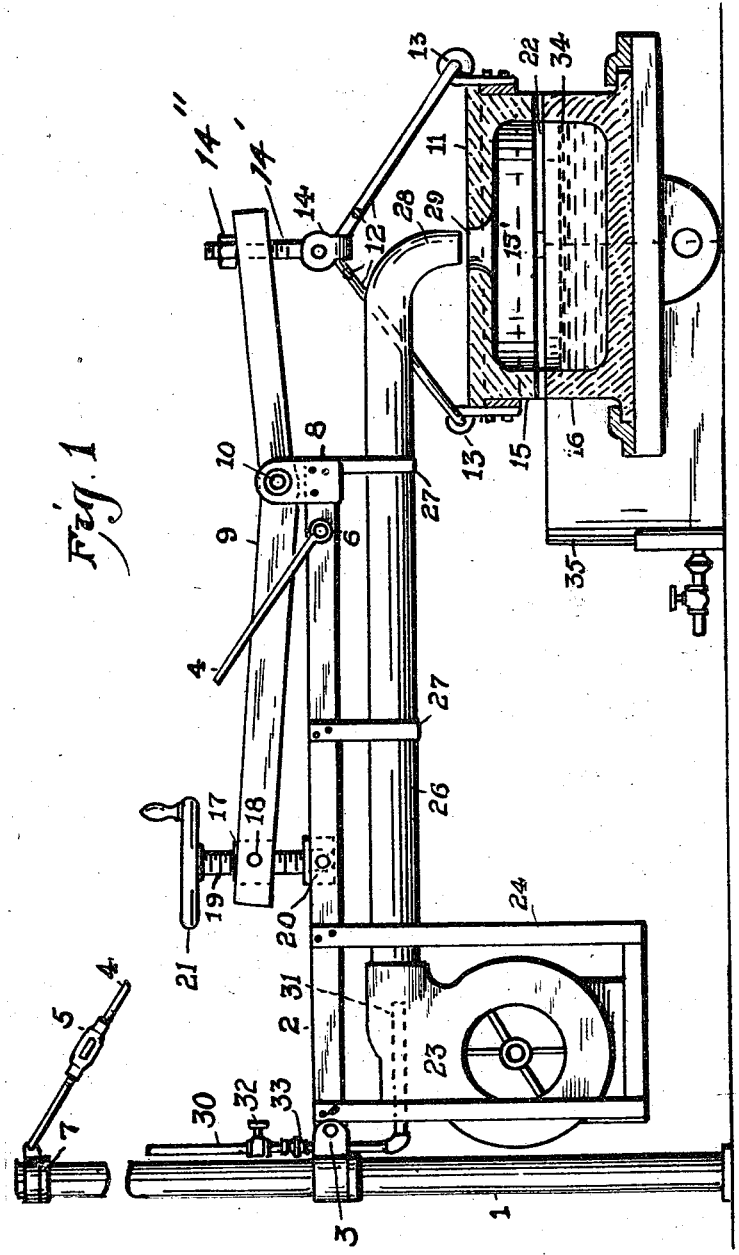
Figure 1 is a side elevation of a heating apparatus partly in section and in accordance with my invention.

Referring in detail to the drawing 1 denotes a rigidly fixed standard to which one end of a horizontally disposed supporting arm 2 is hingedly connected, as indicated at 3. The supporting arm 2 is held in horizontal alignment by a supporting rod 4 which is capable of adjustment by a turn buckle 5 mounted thereon. One end of the rod 4 is attached, as at 6, adjacent to the free end of the supporting arm 2, and the other end thereof is rotatably connected, as at 7, to the standard 1 at some distance above the supporting arm connection 3.

The free end of the supporting arm 2 carries a fixed pair of vertically disposed bearing brackets 8, in which an adjusting bar 9 is pivotally connected, as indicated at 10, intermediate of its ends.

A heat confining hood 11, constructed from any suitable refractory material is suspended from the forward end of the adjusting bar 9 by means of a plurality of hangers 12, connected therewith, as shown at 13. The upper ends of the hangers 12 connect with a yoke 14 carried on the lower end of a vertically adjustable rod 14' extending through the forward end of the bar 9 and mounted on the upper end of the rod 14' is an adjusting nut 14" therefor. The attachment of the hood 11 with the yoke 14 is such that the former will at all times maintain its horizontal suspension by gravity. The peripheral edge of the hood 11 is formed with a depending annular flange 15, the diameter of which is commensurate to the diameter of the glass drawing pot 16 in connection with which my heating apparatus is adapted to be used.

The under side of the hood 11 virtually constitutes the combustion chamber 15' of the heating apparatus, and when in the operative position is suspended directly over the drawing pot 16, as clearly illustrated in Figure 1 of the drawing.

The rear end of the bar 9 carries a screw block 17 provided with a pivotal connection 18 therewith. A vertically disposed adjusting screw 19 is rotatably mounted as at 20, on the supporting arm 2 and is threadably engaged in the screw block 17. The upper end of the adjusting screw 19 is provided with a hand wheel 21 to facilitate the adjustment screw 19 in the block 17. This adjustment determines the clearance 22 required to best meet conditions found in practice, between the lower edge of the annular flange 15 and the top edge of the drawing 16 to permit and stimulate combustion during the heating operation.

A blower 23 is carried at the rear end of the arm 2, and is supported in a suitable frame structure 24 which is fixed to the arm 2 to shift therewith. The blower 23 is driven by a motor 25 also mounted in the frame structure 24. A large conduit 26 is suspended from the supporting arm 2 by a plurality of carriers 27. The inlet end of the conduit 26 is connected to and communicates with the blower 23, and the curved outlet end 28 thereof is positioned directly over and in registration with the aperture 29 formed centrally in the hood 11. The fuel supply pipe 30 supported in any suitable manner, is provided with an outlet 31 positioned in the blower 23 adjacent to the inlet end of the conduit 26. The fuel supply pipe 30 is provided with a regulating valve 32 and a universal joint 33. The latter is provided to permit of the shiftable movement of the associated parts attending the operation of the apparatus.

The admixture of air, provided by the blower 23, with the gas supplied through the supply pipe 30, constitute the combustible elements, which enter chamber 15' through the apertures 29, for combustion. The combustion will be directed on the top of the molten glass 34 and quickly reheat the latter until the consistency thereof is uniform throughout the entire mass thereby assuring a uniform drawn product free from all defects.

If the capacity of the drawing pot 16 is sufficient to allow a number of drawing operations therefrom, the heating apparatus is utilized to reheat the mass to the right consistency after each drawing operation thereby obviating the necessity of conveying a separate mass of molten glass from the melting furnace to the drawing pot 16 after each drawing operation.

For maintaining the hood 11 at a constant operating temperature for instantaneous use at all times, a heating furnace 35 of any suitable design and construction is positioned adjacent to the drawing pot 16. The furnace 35 has the same radial disposition as the pot 16 so that when the hood 11 is shifted on its mechanism from the drawing pot 16, it may be positioned directly over the heating furnace 35 which will maintain the hood 11 at a constant operating temperature until required for again reheating the molten mass deposited in the drawing pot 16.

It will, of course, be obvious that the intensity of the combustion for the successful operation of the heating apparatus is governed by regulation of the fuel supply and the operation of the blower 23 in connection therewith.

From the foregoing description taken in connection with the accompanying drawings, the principle of construction and method of operation will be readily apparent to those skilled in the art to which the invention appertains, and while describing what is now thought to be the best embodiment of the invention, it is to be understood that the device shown in the drawings is merely illustrative, and that various changes in the form, proportions and minor details of construction may be resorted to without departing from the principle of the invention, or sacrificing any of the advantages of the invention, which come within the scope of the claims hereunto appended.

What I claim is:

1. A device for the purpose set forth comprising a heat confining hood constituting a combustion chamber and adapted when active to be positioned on a glass draw pot for closing the latter and to provide for heating the glass therein, a swinging support, means for connecting said hood thereto, a fuel conducting means discharging through said hood into said chamber, and means for forcing the fuel through said conducting means into said chamber, said hood fuel conducting and forcing means carried by and bodily shifted with said support, said hood having an opening axially of its top forming a fuel inlet for said chamber, said opening registering with the discharge end of said conducting means.

2. A device for the purpose set forth comprising a heat confining hood constituting a combustion chamber and adapted when active to be positioned on a glass draw pot for closing the latter and to provide for heating the glass therein, a swinging support, an angle shaped adjustable bar pivoted intermediate its ends on said support, means depending from the outer end of the bar for suspending said hood, means for adjusting said bar, a fuel conducting means discharging through said hood into said chamber, and means for forcing the fuel through said conducting means into said chamber, said hood fuel conducting and forcing means carried by and bodily shifted with said support.

3. A device for the purpose set forth comprising a heat confining hood constituting a combustion chamber and adapted when active to be positioned on a glass draw pot for closing the latter and to provide for heating the glass therein, a swinging support, an angle shaped adjustable bar pivoted intermediate its ends on said support, means depending from the outer end of the bar for suspending said hood, means for adjusting said bar, a fuel conducting means discharging through said hood, into said chamber, and means for forcing the fuel through said conducting means into said chamber, said hood fuel conducting and forcing means carried by and bodily shifted with said support, said hood having an opening in its top forming a fuel inlet for said chamber, said opening registering with the discharge end of said conducting means.

4. A device for the purpose set forth comprising a heat confining hood constituting a combustion chamber and adapted when active to be positioned on a glass draw pot for closing the latter and to provide for heating the glass therein, a swinging support, an angle shaped adjustable bar pivoted intermediate its ends on said support, means depending from the outer end of the bar for suspending said hood, means for adjusting said bar, a fuel conducting means discharging through said hood into said chamber, means for forcing the fuel through said conducting means into said chamber, said hood fuel conducting and forcing means carried by and bodily shifted with said support, and a controllable fuel supply conduit opening into said forcing means and shiftable with said support.

5. A device for the purpose set forth comprising a heat confining hood constituting a combustion chamber and adapted when active to be positioned on a glass draw pot for closing the latter and to provide for heating the glass therein, a swinging support, means for connecting said hood thereto, a fuel conducting means discharging through said hood into said chamber, means for forcing the fuel through said conducting means into said chamber, said hood fuel conducting and forcing means carried by and bodily shifted with said support, said hood having an opening axially of its top forming a fuel inlet for said chamber, said opening registering with the discharge end of said conducting means, and means for maintaining said hood at an even temperature when the hood is in an inactive position.

6. A device for the purpose set forth comprising a heat confining hood constituting a combustion chamber and adapted when active to be positioned on a glass draw pot for closing the latter and to provide for heating the glass therein, a swinging support, means for connecting said hood thereto, a fuel conducting means discharging through said hood into said chamber, means for forcing fuel through said conducting means into said chamber, said hood fuel conducting and forcing means carried by and bodily shifted with said support, a controllable fuel supply conduit opening into said forcing means and shiftable with said support, and means for maintaining said hood at an even temperature when the hood is in an inactive position.

7. A device for the purpose set forth comprising a heat confining hood constituting a combustion chamber and adapted when active to be positioned on a glass draw pot for closing the latter and to provide for heating the glass therein, a swinging support, an angle shaped adjustable bar pivoted intermediate its ends on said support, means depending from the outer end of the bar for suspending said hood, means for adjusting said bar, a fuel conducting means discharging through said hood into said chamber, means for forcing the fuel through said conducting means into said chamber, said hood fuel conducting and forcing means carried by and bodily shifted with said support, a controllable fuel supply conduit opening into said forcing means and shiftable with said support, and means for maintaining said hood at an even temperature when the hood is in an inactive position.

In testimony whereof I affix my signature.

LEON J. HOUZE, Sr.